United States Patent [19]

Camargo et al.

[11] Patent Number: 5,047,487

[45] Date of Patent: Sep. 10, 1991

[54] COMPOSITIONS OF POLY(IMIDES) HAVING PHENYLINDANE DIAMINES AND/OR DIANHYDRIDE MOIETIES IN THE POLY(IMIDE) BACKBONE

[75] Inventors: Rafael Camargo, Foster City; Frank Mercer, Belmont; Tai C. Cheng, Mountain View, all of Calif.

[73] Assignee: Raychem Corporation, Menlo Park, Calif.

[21] Appl. No.: 336,587

[22] Filed: Apr. 10, 1989

Related U.S. Application Data

[63] Continuation of Ser. No. 9,317, Jan. 20, 1987, abandoned, which is a continuation-in-part of Ser. No. 815,343, Dec. 31, 1985, abandoned, which is a continuation-in-part of Ser. No. 688,783, Jan. 4, 1985, abandoned.

[51] Int. Cl.$^5$ .................. C08L 79/08; C08L 67/03; C08L 69/00; C08L 71/12
[52] U.S. Cl. ................... 525/432; 525/397; 525/425; 525/433; 525/436; 525/538; 424/342.2; 428/411.1
[58] Field of Search ............... 525/397, 432, 436, 433

[56] References Cited

U.S. PATENT DOCUMENTS

| | | | |
|---|---|---|---|
| 3,658,938 | 4/1972 | Kwiatkowski et al. | 525/436 |
| 3,856,752 | 12/1974 | Bateman et al. | 528/182 |
| 4,026,876 | 3/1977 | Bateman et al. | 528/350 |
| 4,224,214 | 9/1980 | Chen | 528/350 |
| 4,258,155 | 3/1981 | Holub et al. | 525/436 |
| 4,293,670 | 10/1981 | Robeson et al. | 525/436 |
| 4,430,484 | 2/1984 | Quinn | 525/433 |

OTHER PUBLICATIONS

Paul et al., Marcomol. Sci. Rev. Macromol. Chem., C13, 109, 110, (1980).

Primary Examiner—Ana L. Carrillo
Attorney, Agent, or Firm—Yuan Chao; Herbert G. Burkard

[57] ABSTRACT

This invention relates to novel compositions of a poly(imide) having phenylindane diamine and/or dianhydride moieties in the poly(imide) backbone and a polymeric component comprising:

(a) a poly(etherimide) free of phenyl indane moieties in its backbone;
(b) a poly(sulfone);
(c) a poly(aryl ether ketone);
(d) a poly(carbonate); or
(e) a poly(arylate);

and the compositions which have been cured. The compositions are useful as adhesives, coatings and matrix resins for fiber reinforced composites. The invention also relates to a multi-layered article for use in electronic devices, the article comprising a plurality of layers each comprising a cured composition of the invention with one or more intervening layers of conductive or semi-conductive material.

12 Claims, No Drawings

COMPOSITIONS OF POLY(IMIDES) HAVING PHENYLINDANE DIAMINES AND/OR DIANHYDRIDE MOIETIES IN THE POLY(IMIDE) BACKBONE

CROSS-REFERENCE TO RELATED APPLICATIONS

This application is a continuation of application Ser. No. 07/009,317, filed Jan. 20, 1987, now abandoned, which is a continuation-in-part of application Ser. No. 06/815,343, filed Dec. 31, 1985, now abandoned, which is a continuation-in-part of application Ser. No. 06/688,783, filed Jan. 4, 1985, now abandoned, the disclosures of which are incorporated herein by reference.

BACKGROUND OF THE INVENTION a) Field of the Invention

This invention relates to novel polymeric compositions and the composition after it has been cured. In particular, the invention relates to polymeric compositions comprising a blend of poly(imide) selected from poly(imides) having phenylindane diamine and/or dianhydride moieties in the poly(imide) backbone and a polymeric component.

b) Background and Invention

Poly(imides) having phenylidane diamine and/or dianhydride moieties in the poly(imide) backbone are described in U.S. Pat. No. 3,856,752, the disclosure of which is incorporated herein by reference. A preferred such poly(imide) of the composition is XU218 from Ciba-Geigy which is of the formula:

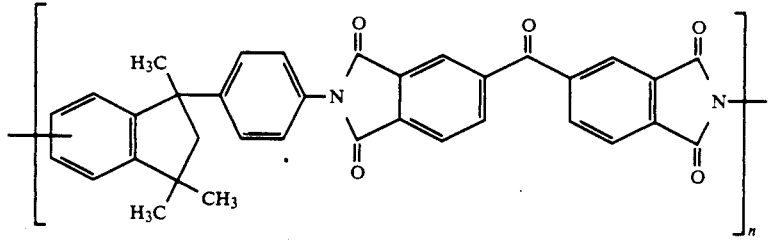

wherein n is greater than 1.

These polymers are known to be useful as shaped structures, self-supporting films, fibers, filaments and coatings. They, generally, have high tensile strength, are susceptible to hydrolysis, are infusible, insoluble, and stable to heat. They may be used in corrosion resistant pipes, pipe-lagging and duct work, a lining therefore for containers and in laminating structures where the polymers are bonded to the sheet metal or foils, oven interiors, electrical insulation and semiconductor coatings.

Poly(imides) are known to produce resins with high strength, rigidity, thermal stability, high continuous use temperature and solvent resistance. One of the problems that has been encountered in the use of poly(imides) is the tendency of the polymers to crack. Further, when used as adhesives and coatings the adhesion between the polymer and various substrates can be less than required for high performance applications.

SUMMARY OF THE INVENTION

It has been discovered that novel compositions of blends of poly(imides) having phenylindane diamines and/or dianhydride moieties incorporated into the poly(imide) backbone and a polymeric component selected from the group consisting of:
a) a poly(etherimide) free of phenylindane moieties in its backbone;
b) a poly(sulfone);
c) a poly(aryl ether ketone);
d) a poly(carbonate);
e) a poly(arylate); and
f) a poly(phenylene oxide)

and the compositions which have been cured are useful for their improved adhesive properties, solvent cracking resistance, high temperature properties and are useful as coatings especially for semiconductors and are melt processable or melt fusible. Even further, it has been discovered that the compositions are useful as the matrix resin for reinforced composites. The composition is also useful in making an article comprising a substrate having on a surface thereof at least one layer of the cured composition of the invention. Of particular interest are articles containing a plurality of layers, each comprising a cured composition of this invention, with a conductive layer interposed between two adjacent layers. Such articles can be used as packaged interconnect devices for integrated circuits.

DETAILED DESCRIPTION OF THE INVENTION

Poly(imides) for the preparation of the blends of this invention have phenylindane diamine and/or phenylindane dianhydride moieties in their backbone. A specific preferred poly(imide) has the repeat unit.

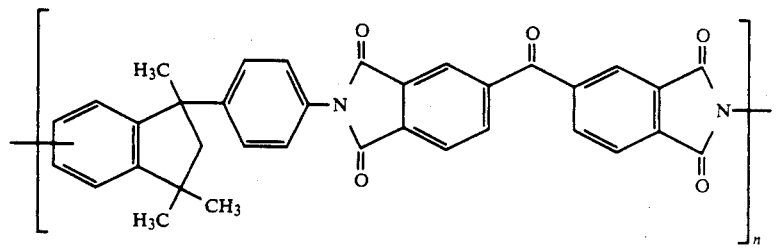

Poly(imides) of this invention can be prepared by the condensation of a diamine monomer with a dianhydride monomer in an organic reaction medium which is a solvent for at least one of the reactants, preferably under substantially anhydrous conditions, at a temperature below 100° C. and conveniently at room temperature. The initial product is a polyimide acid, which can then be cyclized or imidized to the poly(imide) by methods such as heating at an elevated temperature, typically between 100° C. and 240° C., or treatment with a chemical agent such as acetic anhdyride, alone or in combination with a tertiary amine catalyst.

Phenylindane diamine monomers which can be used have the general formula

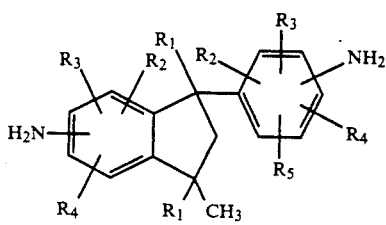

wherein $R_1$ is hydrogen or an alkyl group from 1 to 5 carbon atoms, and $R_2$, $R_3$, $R_4$, and $R_5$ are independently hydrogen, halogen, or lower alkyl having 1 to 4 carbon atoms.

Phenylindane dianhydride monomers which can be used have the general formula

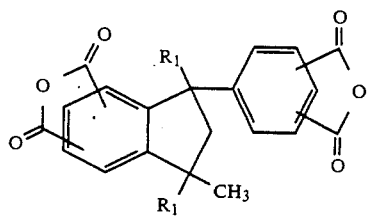

where $R_1$ is as hereinbefore defined.

It is not necessary that both the diamine and the dianhydride be derived from phenylindane. For example, a non-phenylindane derived diamine can be polymerized from a phenylindane dianhydride, or vice-versa. All that is required is that one of the two monomers, the diamine or the dianhydride, be phenylindane derived.

Examples of suitable non-phenylindane diamine monomers include, but are not limited to: 4,4'-diaminobenzophenone; 4,4'-methylenebis(o-chloroaniline); m-phenylenediamine; p-phenylenediamine; 4,4'-methylenedianiline; 4,4'-oxydianiline; 4,4'-sulfonyldianiline; 4,4'-isopropylidenedianiline; and diaminotoluene.

Examples of suitable non-phenylindane dianhydride monomers include, but are not limited to: 1,4,5,8-naphthalene tetracarboxylic dianhydride; 3,3',4,4'-benzophenonetetracarboxylic acid dianhydride; 3,3',4,4'-biphenyltetracarboxylic acid dianhydride; pyromellitic dianhydride; 4,4'-isopropylidenediphthalic anhydride; 4,4'-oxydiphthalic anhydride; 4,4'-methylenediphthalic anhydride; and 4,4'-sulfonyldiphthalic anhydride.

In the composition of this invention, it is preferred that the poly(imide) component comprises from about 99% to about 1% by weight of the composition and the polymeric component comprises from about 1% to about 99% to the composition. It is further preferred that the polymer component comprise at least about 25%, by weight of the composition. It is further preferred that the poly(imide) component comprise from about 15% to about 75% by weight of the composition.

The compositions of this invention comprise the polymeric component as described above. The polymeric component may contain one or more additional components as set forth in detail below.

POLYETHERIMIDES

The poly(etherimides) suitable for use in this invention are free of phenylindane moieties in their backbone. Such poly(etherimides) are well known in the art and described in, for example, U.S. Pat. Nos. 3,847,867, 3,838,097 and 4,107,147, incorporated herein by reference. A preferred poly(etherimide) has the structure

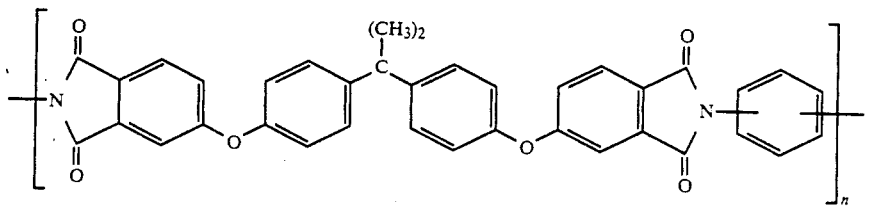

where n is greater than 1 but preferably from about 10 to about 10,000 or more and is available, for example, as Ultem D-1000 (General Electric) a high molecular weight, amorphous and melt processable polymer.

Poly(sulfones) suitable for use in this invention are well known and comprise linear thermoplastic polyarylene polyethers wherein the arylene units are interspersed with a sulfone linkage. These polymers may be obtained by reaction of an alkali metal double salt of a dihydric phenol and a dihalobenzenoid or dinitrobenzenoid compound either or both which contain a sulfone linkage, i.e. -SO$_2$-, between arylene groupings, to provide sulfone units in the polymerchain. Polymers of this sort are further described in U.S. Pat. No. 4,293,670 incorporated herein by reference. Preferred poly(sulfones) are of the formula:

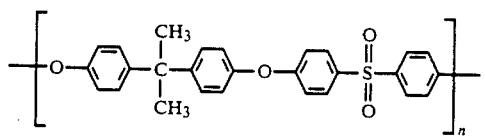

or

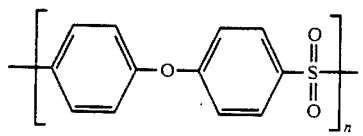

wherein n is greater than 1 but preferably from about 10 to about 10,000 or more.

Poly(aryl ether ketones) suitable for use in this invention have the repeat units of the formula:

-CO-Ar-CO-Ar'- wherein Ar and Ar' are aromatic moieties at least one of which contains a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Such linking groups include for example, carbonyl, ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

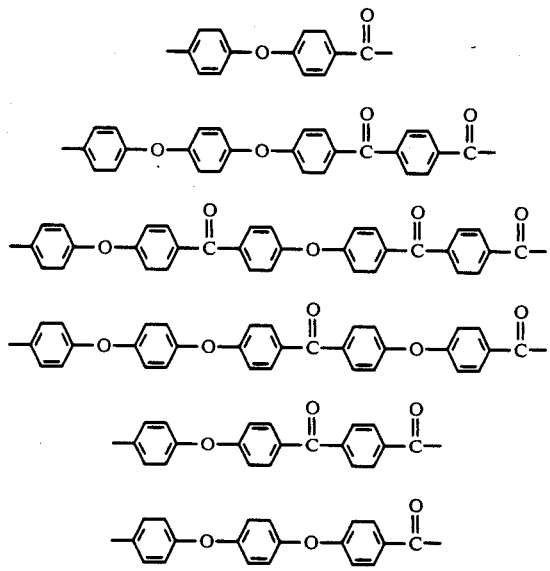

Poly(aryl ether ketones) can be prepared by known methods of synthesis. Preferred poly(aryl ether ketones) can be prepared by Friedel-Crafts polymerization of a monomer system comprising:

(I)
  i) phosgene or an aromatic diacid dihalide together with
  (ii) a polynuclear aromatic comonomer comprising:
    (a) H-Ar-O-Ar-H
    (b) H-(Ar-O)$_n$-Ar-H
       wherein n is 2 or 3
    (c) H-Ar-O-Ar-(CO-Ar-O-Ar)$_m$-H
       wherein m is 1, 2 or 3 or
  II) an acid halide of the formula:

H-Ar''-O-[(Ar''-CO)$_p$-(Ar''-O)$_q$-(AR''-CO)$_r$]$_k$-Ar''-CO-Z wherein Z is halogen, k is 0, 1 or 2, p is 1 or 2, q is 0, 1 or 2 and r is 0, 1 or 2;

or
  III) an acid halide of the formula:

H-(Ar''-O)$_n$-Ar''-Y wherein n is 2 or 3 and Y is CO-Z or CO-Ar''-CO-Z where Z is halogen;
wherein each Ar'' is independently selected from substituted or unsubstituted phenylene, and substituted and unsubstituted polynuclear aromatic moieties free of ketone carbonyl or ether oxygen groups, in the presence of a reaction medium comprising:
  A) A Lewis acid in an amount of one equivalent per equivalent of carbonyl groups present, plus one equivalent per equivalent of Lewis base, plus an amount effective to act as a catalyst for the polymerization;
  B) a Lewis base in an amount from 0 to about 4 equivalents per equivalent of acid halide groups present in the monomer system;
  C) a non-protic diluent in an amount from 0 to about 93% by weight, based on the weight of the total reaction mixture.

The aromatic diacid dihalide employed is preferably a dichloride or dibromide. Illustrative diacid dihalides which can be used include, for example

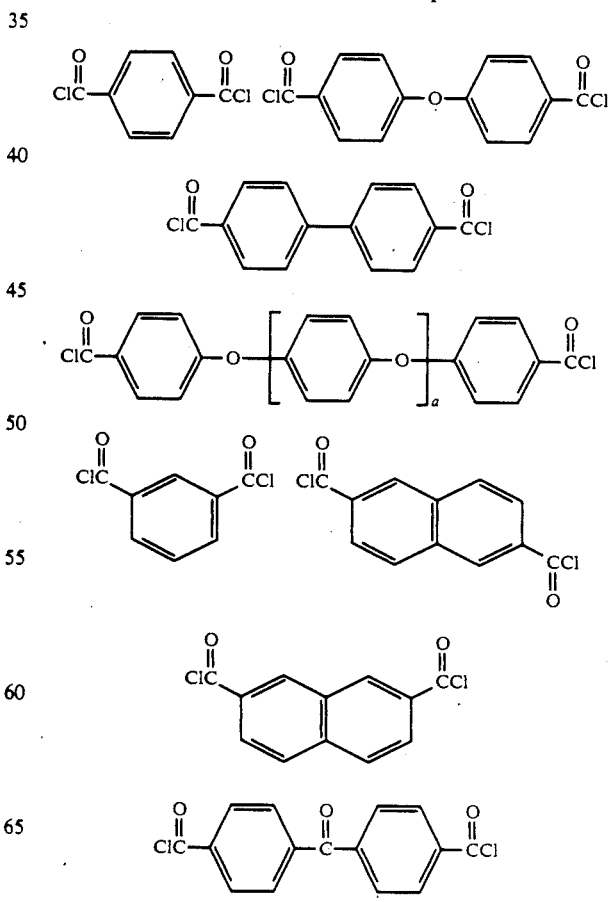

wherein a is 0-4.

Illustrated polynuclear aromatic comonomers which can be used with such diacid halides are:

(a) H-Ar''-O-Ar''-H, which includes, for example:

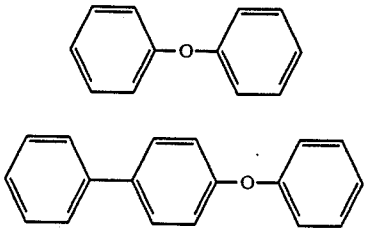

(b) H-(Ar''-O)$_n$-Ar''-H, which includes, for example:

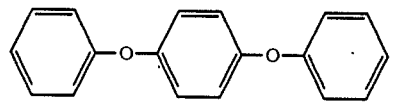

and

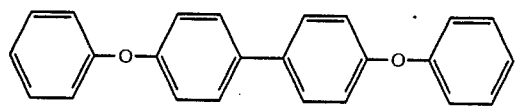

(c) H-Ar''-O-Ar''-(CO-Ar''-O-Ar'')$_m$-H, which includes, for example:

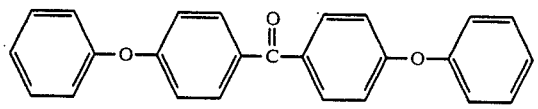

and
(d) H-(Ar''-O)$_n$-Ar''-CO-Ar''-(O-Ar'')$_m$-H which includes, for example:

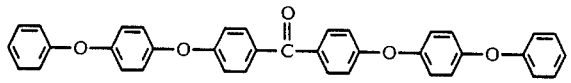

Monomer systems II and III comprise an acid halide. (The term acid halide is used herein to refer to a monoacid monohalide.) In monomer system II, the acid halide is of the formula:

H-Ar''-O-[(Ar''-CO)$_p$-(Ar''-O)$_q$-(Ar''-CO)$_r$]$_k$-Ar''-CO-Z

Such monomers include for example, where k=0

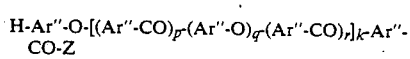

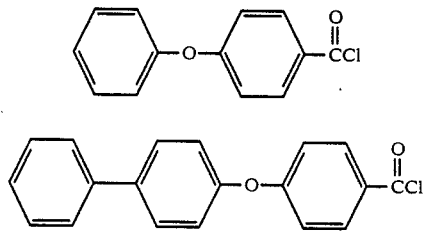

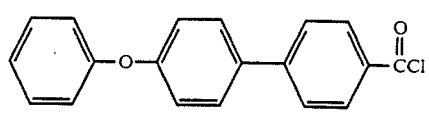

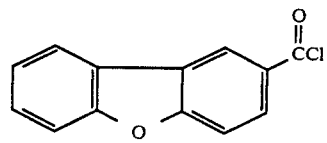

and where k=1

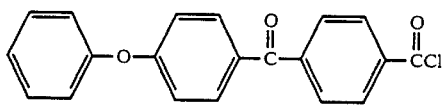

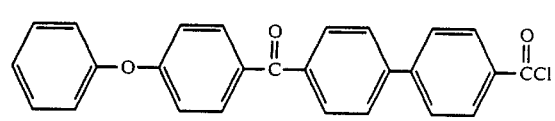

In monomer system III, the acid halide is of the formula

H-(Ar''-O)$_n$-Ar''-Y

Examples of such acid halides include

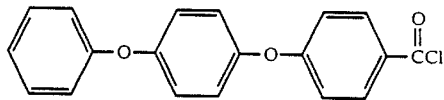

and

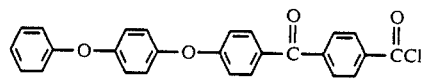

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long a one or more of the comonomers used contains at least one ether oxygen linkage. Such comonomers include for example:

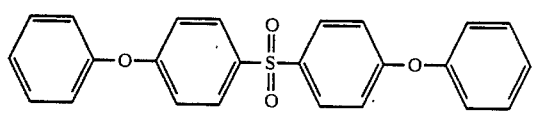

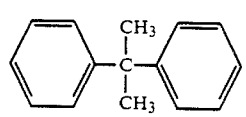

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

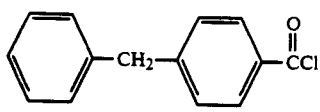

can be used as a comonomer together with an ether-containing polynuclear aromatic acid halide or as an additional comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(aryl ether ketones) can be found in commonly assigned co-pending U.S. application Ser. No. 594,503, filed 31 March 1984, the disclosure of which is incorporated herein by reference.

Other processes for preparing these polymers can be found in U.S. Pat. Nos. 3,953,400, 3,956,240, 3,928,295, 4,176,222 and 4,320,224.

The poly(carbonates) suitable for use in the invention are well known and are thermoplastic linear polyesters of carbonic acid, made by the polymeric condensation of bisphenols with a phosgene or its derivatives. These polymers are known for their excellent properties of toughness, flexibility, impact strength, optical clarity and heat resistance. More recent representative examples are included in U.S. Pat. Nos. 4,469,861, 4,469,833, 4,469,860, 4,469,852, 4,469,850 and 4,469,838. Preferred poly(carbonates) include any of the Lexan grades available from General Electric which have the general formula:

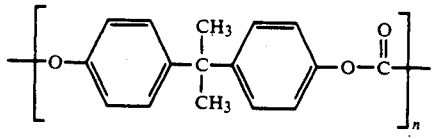

wherein n is greater than 1 but preferably from about 10 to about 10,000 or more.

Poly(arylates) suitable for use in the invention are aromatic polyesters derived from a dihydric phenol, particularly bisphenol A and an aromatic dicarboxylic acid, particularly mixtures of terephthalic and iso-phthalic acids. See for example and further definition U.S. Pat. Nos. 4,246,381 and 4,250,279 incorporated herein by reference. A preferred poly(arylate) is of the formula:

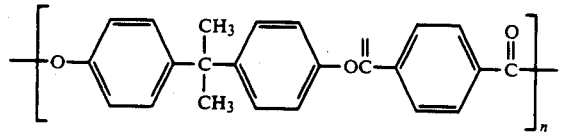

wherein n is greater than 1 but preferably from about 10 to about 10,000 or more, commercially available from Union Carbide under the trade name of Ardel in a number of grades which differ in average molecular weight.

It is understood that one or more poly(imides) having phenylindane diamine and/or dianhydride moieties in the poly(imide) backbone and one or more poly(etherimide), poly(sulfone), poly(aryl ether ketone); poly(arylate) or poly(carbonate) can be present in the composition to provide the desired physical properties of the final article. The polymers or copolymers can be used in any of the various commercial grades which may vary in average molecular weights, molecular weight distributions and may contain minor amounts of comonomer residues and the like.

A preferred embodiment includes compositions comprising
1) a poly(imide) having phenylindane diamine and/or dianhydride moieties in the poly(imide) backbone;
2) a poly(etherimide); and
3) a poly(aryl ether ketone).

It is well known that most polymers are generally incompatible with each other. Most blends of two or more polymers contain the separate polymers as individual components domains or phases. Thus blends of what are termed compatible polymers generally are mechanically compatible only and exhibit properties which vary widely over the concentration range of the polymers. Such blends comprise a matrix polymer containing the other polymer as a dispersed or co-continuous phase. Such dispersed phases can be microscopic in size sometimes giving the resulting blend of multiple phases the appearance of being a single phase. There are, however, a few pairs of polymers which are molecularly compatible, that is, they form a molecularly dispersed mixture comprising a single amorphous phase when they are blended together. Not only do such blends not separate into their individual amorphous components, but they are also characterized by having a single glass transition temperature (Tg) and optical transparency. Mechanically compatible blends, on the other hand, exhibit two or more Tg's characteristic of the Tg's of the individual components. By the term glass transition temperature is meant the temperature at which an amorphous polymer or the amorphous regions of a partially crystalline polymer changes to or from a hard and relatively brittle state to a more flexible or rubbery condition. Measurement of glass transition temperatures of polymer systems is described, for example, in *Thermal Characterization Techniques*, Slade, et al., Marcel Dekker, Inc., New York (1970).

It has been surprisingly found that blends of the invention consisting of a poly(imide) and a poly(ether imide) and which may further contain a poly(aryl ether ketone), as described above, are molecularly compatible.

Blends of the molecularly compatible polymers are characterized in that they comprise a single amorphous phase although one or more of the individual polymers may also have crystalline portions which may exist as a separate phase. One aspect of this degree of compatibility is that the amorphous phase exhibits a single glass transition temperature as defined above.

The compositions of the invention can contain various additives in addition in order to give any desired property to the composition. For example, stabilizers, flame retardants, pigments, plasticizers, surfactants, antioxidants and the like can be present. Compatible or non-compatible polymers may also be added to give desired properties.

The composition can be prepared by any convenient technique. For example, the components can be mixed on a two-roll mill, in an internal mixer such as a Brabender mixer or Banbury mixer, or in a twin-screw extruder. They may also be prepared by precipitation from a solvent, or cast from solution or the like. The compositions can be substantially cured preferably at elevated temperature i.e. 250°–350° C. for 30 min. to 3 hours. Where appropriate, the composition may also be cured by radiator or other means appropriate to the components selected.

A shaped article of the composition can be formed before or after cure by known techniques depending on the desired shape. Films or coatings of the blend can be formed by extrusion, spraying, spin coating or casting, fibers by melt spinning or the like. Other articles may be injection molded, compression molded, pour molded, blow molded or the like with or without additives as previously described.

The compositions of the invention are useful adhesives and semiconductor coatings which include alpha particle barriers, coatings for passivation and mechanical protection, and interlayer dielectrics.

The invention also relates to a reinforced composition comprising the blend and a reinforcing component e.g. carbon, or glass fibers or other polymeric fibers or the like, such as polyamides (e.g. poly(aramide) sold by Dupont under the trade name Kevlar) forming a high strength composite.

The compositions of this invention are particularly advantageous in the preparation of a layered article, in particular a multi-layered article for use in electronic systems. The article comprises a substrate, for example of glass or ceramic material, with at least one layer comprising a cured, aromatic polymer-based composition of this invention deposited on a surface thereof. Generally a plurality of layers are successively deposited on the substrate and cured. One or more layers of conductive material can be interposed between two adjacent layers of the aromatic polymer-based composition. The conductive layer is generally not continuous or coextensive with the adjacent polymeric layers and typically forms a plurality of electrically conductive pathways. The conductive layer is preferably of metal but can comprise a semi-conductive element.

In preparing such articles, the composition used is preferably highly resistant to hydrolysis and has a water absorption of less than about 2%, preferably less than about 1% when contacted with water at 90° C. for 960 minutes. The composition preferably also is a dielectric having a dielectric constant less than about 5, preferably less than about 3.

The article is prepared by coating the aromatic polymer in the form of a solution, preferably by a spin coating technique, onto the substrate. The solvent is evaporated and the composition is cured at elevated temperatures. Typically, the thickness of the coating is about 5 to 40 microns. The conductive layer is applied over the polymeric layer using, for example, a sputtering technique with appropriate areas masked to create the desired conductive pathways. The next polymeric layer is applied in the same manner as the first. These two steps can be repeated until the desired multi-layered article is produced. The multi-layered article can be used, for example, as a packaging-interconnect device for integrated circuits.

The following examples are representative of the invention but not intended to be limiting. Substitution of additives materials, polymers, and conditions which are obvious from this disclosure are within the contemplation of the invention.

DESCRIPTION OF THE PREFERRED EMBODIMENTS

EXAMPLE 1

Method to Prepare Ultem/XU218 Films

To 400 ml of dichloromethane was added X g of ULTEM polyetherimide and 40 - X g of XU218 polyimide. The values of X for the different compositions prepared are given in the table below. The blends were stirred occasionally until homogeneous solutions were obtained. The mixtures were then precipitated by adding them slowly to 1000 ml of ethanol in a high speed blender. The resulting powder mixtures were dried in air for 24 hours at room temperature and then dried in a vacuum oven at 80° C. for 15 hours. The dry powder was pressed for 5 minutes at 320° C. to produce amber films, with a thickness of each 0.125 mm. A small disc of each blend weighing 15–20 mg was placed in DSC pans and run from 200° C. to 360° C. at 10° C./min, to determine the glass transition temperatures, Tg. A single Tg was found in all samples, which increased with XU218 composition values are listed below.

| % X U215 | Tg |
|---|---|
| 0% | 215° C. |
| 30% | 228° C. |
| 50% | 244° C. |
| 67% | 273° C. |
| 80% | 294° C. |
| 100% | 315° C. |

EXAMPLE 2

Blends of XU218 and Other Polymers

To 500 ml of solvent was added 25 g of XU218 polyimide and 25 g of a second aromatic polymer. The list of the polymers used are given in Table 1. The blends were stirred continuously until a homogeneous solution was observed. At this point the solutions were precipitated by adding them slowly to each 1000 ml of ethanol in a high speed blender. The resulting powder was dried in air for 24 hours at room temperature and then dried in vacuum. The dry powder was pressed for 5 minutes at 320° C., to produce slabs with a thickness of 0.125 mm. All films, except C were clear amber colored, and flowed normally during the pressing operation. In addition a fifth blend (E) was prepared in similar fashion using 250 g of polyetherimide and 25.0 g of an aromatic polyimide.

TABLE 1

| SAMPLE | POLYMER(S) | SOLVENT |
|---|---|---|
| A | Polysulfone(1) | N,N'-dimethylformamide |
| B | Polyethersulfone(2) | N',N'-dimethylformamide |
| C | Poly 2'6-dimethyl phenylene oxide | Chloroform |
| D | Polyarylester(3) | Methylene chloride |
| E | Polyetherimide + Aromatic Polyimide(4) | N,N'-dimethylacetamide |

(1)Udel P1700 Union Carbide Corp.
(2)Victrex 300P I.C.I. American
(3)Ardel D100 Union Carbide Corp.
(4)PI2080 Upjohn Chemicals

EXAMPLE 3

Blends of XU218 Containing Ardel Polyarylate

To 100 ml of chloroform was added Xg of XU218 and 10-X g of Ardel. The values for the three compositions prepared are given in the table below. The blends were stirred occasionally until all polymer was dissolved and a clear solution was observed. Approximately 10 ml of the solution were spreaded with a casting knife having a clearance of 0.5 mm on a clean glass plate pretreated with a fluorocarbon release agent. The films were dried in an oven at 100° C. for 2 hours, and released off the substrate by immersion in water. The free films having an average thickness of 0.025 mm were dried for 1 hour at 120° C. and then annealed for 2 hours at 350° C. In addition to the three films described above, a fourth film was prepared by adding 3.3 g of XU218, 33 g of Ultem polyether imide and 3.3 g of Ardel to 100ml of chloroform. Also a control XU218 film was prepared under similar conditions. Percent gel for the different specimens was measured by refluxing approximately 0.2 g of the film in chloroform for 24 hours. The percent gel values thus measured are also given in the table.

TABLE 2

| | Compositions of XU218/Ardel Films | | | |
|---|---|---|---|---|
| | Weight of Polymer, g per 10 g of the Blend | | | |
| SAMPLE | XU218 | ARDEL | ULTEM | % GEL(1) |
| A | 7.5 | 2.5 | — | 85 |
| B | 5.0 | 5.0 | — | 90 |
| C | 2.5 | 7.5 | — | 93 |
| D | 3.3 | 3.3 | 3.3 | 100 |
| CONTROL | 10.0 | — | — | 0 |

(1)In chloroform, after treating the film at 350° C. for 2 hours.

EXAMPLE 4

Tri Blends of Victrex PEEK, Ultem and XU218

1. A Victrex PEEK/ULTEM/XU218 blend was prepared as follows: to 75 ml of methylene chloride was added 6.25 g of ULTEM, and 6.25 g of XU218. After the solids were totally dissolved, 37.5 g of Victrex PEEK powder were added. The slurry was cast on aluminum foil and air dried overnight. The resulting material was further dried for 16 hours at 125° C. The powder was pressed at 400° C. for 3 minutes to yield a transparent plaque (0.7 mm thick).

EXAMPLE 5

A Victrex PEEK/Ultem (75/25) blend was prepared as described in Example 4, using 12.5 g of Ultem and 37.5 g of Victrex PEEK. Plaques of Victrex PEEK/Ultem and pure Victrex PEEK were pressed under the same conditions given above (400° C., 3 minutes then quench in cold water press). DSC samples of the three materials were prepared using 17±2 mg. DSC run were done from 50° C. to 380° C. at 40° C/minute. In all four cases, a single Tg was observed, higher for the blends than for pure Victrex PEEK. A summary of DSC data is given below.

| SAMPLE | VICTREX PEEK % | ULTEM % | XU218 % | Tg* | Tc | Tm |
|---|---|---|---|---|---|---|
| 1 | 33.3 | 33.3 | 33.3 | 175 | — | 334 |
| 2 | 63.5 | 12.5 | 25 | 158 | 202 | 341 |
| 3 | 75 | 12.5 | 12.5 | 156 | 206 | 339 |
| 4 | 75 | 25 | — | 157 | 211 | 338 |
| 5 | 100 | — | — | 150 | 188 | 340 |

*All in degrees Celsius

Samples 1 through 5 were then annealed at 316° C. for 45 minutes. About 0.18 g of sample was placed in vials and 20 ml of concentrated sulfuric acid was added to each vial. After 48 hours samples 4 and 5 had completely dissolved. Samples 1, 2, and 3 on the other hand, were only partially dissolved.

The experimental data thus suggests that the Victrex PEEK/Ultem/XU218 blends: (1) are molecularly compatible as shown by a single Tg; and (2) can be thermally crosslinked.

EXAMPLE 6

A Victrex PEEK/Ultem/XU218 blend (75/20/5) was prepared as described in Example 4, using 750 g of Victrex PEEK, 200 g of Ultem and 50 g of XU218 in 1,000 ml of methylene chloride. The resulting dry powder was extruded without problems on the ZSK twin screw extruder to yield a light amber transparent material of relatively uniform pellet size.

EXAMPLE 7

To 2.0 l of dichloromethane was added 247.5 g of Ultem 100 and 247.5 g of XU218. The blend was continually stirred for 72 hours until a dark amber, viscous, homogeneous solution was obtained. The polymer blend thus obtained, was precipitated by adding it under vigorous stirring to an equal volume of ethanol. The powder thus formed was filtered and dried for 10 hours at 125° C. in an air circulating oven.

EXAMPLE 8

To 2,000 ml of dichloromethane was added 200.0 g of XU218 and 200.0 g of Ardel 100. The blend was again allowed to dissolve under stirring for 72 hours. At this point the viscous solution was precipitated and dried as described in 1. 66.6 weight percent of the dried XU-218/Ardel blend and 33.3 weight percent Victrex PEEK 45b powder were extruded on a Brabender twin screw extruder at about 390° C. A brown extrudate was obtained and pelletized. The triblend had a single Tg of 152° C.

EXAMPLE 9

To 0.75 l of dichloromethane was added 50 g of XU218 and 50.0 g of polycarbonate (Lexan) once again the solution was formed by continuous stirring at room temperature for 72 hours.

EXAMPLE 10

Method to Prepare XU218/Ultem Adhesive Films

To 200 ml of dichloromethane was added Xg of XU218 and 20 g of Ultem polyetherimide. The blends were stirred until homogeneous solutions were obtained. The mixtures were precipitated by adding the solution to 500 ml of isopropanol in a high speed blender. The resulting powder was dried in air 18 hours and at 125° C. for 6 hours. The dry powder was pressed at 320° C. for 1 minute to yield amber films.

The lap shear strengths for stainless steel to stainless steel adhesive bonds using the XU218/Ultem blends are listed below:

| Lap Shear Strengths For Stainless Steel Adhesive Bonds (¼" Overlap) | | |
|---|---|---|
| XU-218/Ultem Ratio | Test Temperature | Lap Shear (psi) |
| 0/100 | 22° C. | 1887 |
| 0/100 | 260° C. | less than 50 |
| 67/33 | 22° C. | 2650 |
| 67/33 | 260° C. | 1046 |
| 75/25 | 22° C. | 2800 |
| 75/25 | 260° C. | 1770 |
| 80/20 | 260° C. | 1145 |
| 100/0 | 22° C. | less than 50 |

Adhesive bonding conditions are 100 psi, 343° C. for 20 minutes.

EXAMPLE 11

Coatings

To 100 ml dry 1-methyl-2-pyrrolidinone (NMP) was added 15 grams XU-218 and 5 grams Ultem 1000. The solution was stirred until all the solids dissolved. Five ml of the solution was spin coated on to a 4 inch by 4 inch ceramic substrate at 1000 rpm. After 15 seconds the substrate was stopped and the same was dried and cured under the following conditions: 80° C. for 20 minutes, 200° C. for 30 minutes, 350° C. for 3.5 hours and 250° C. for 1 hour. A yellow, brown coating resulted. A second layer was applied, dried and cured as described above. No cracks in the first or second layers of the cured polyimide could be detected when the sample was examined with an optical microscope (50X).

What is claimed is:

1. A composition comprising a blend of (I) a poly(imide) having phenylindane diamine or phenylindane dianhydride moieties in its backbone, said polyimide being made by the reduction of a diamine monomer (i) selected from the group consisting of

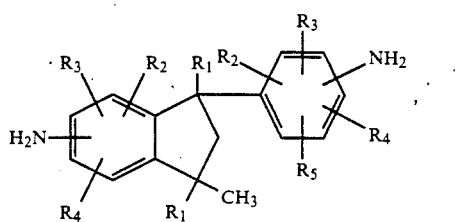

4,4'-diaminobenzophenone, 4,4'methylenebis(o-chloroaniline), m-phenylenediamine, p-phenylenediamine, 4,4'-methylenedianiline, 4,4'-oxydianiline, 4,4'-sulfonyldianiline, and 4,4'-isopropylidenedianiline, where $R_1$ is hydrogen or an alkyl group having from 1 to 5 carbon atoms, and $R_2$, $R_3$, $R_4$, and $R_5$ are independently hydrogen, halogen, or lower alkyl having 1 to 4 carbon atoms; and a dianhydride monomer (ii) selected from the group consisting of

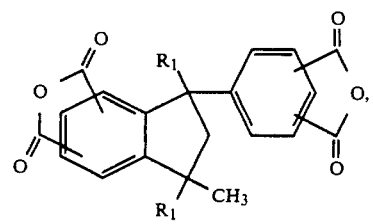

1,4,5,8-naphthalene tetracarboxylic dianhydride, 3,3',4,4'-benzophenonetetracarboxylic acid dianhydride, pyromellitic dianhydride, 4,4'-isopropylidenediphthalic anhydride, 4,4'-oxydiphthalic anhydride, 4,4'-methylenediphthalic anhydride, and 4,4'-sulfonyldiphthalic anhydride, where $R_1$ is as hereinabove defined; provided that at least one of said diamine monomer (i) or dianhydride monomer (ii) contains a phenylindane moiety; and (II) a polymeric component which is a poly(ether imide) free of phenylindane moieties in its backbone.

2. A composition according to claim 1, wherein the poly(imide) comprises from about 1% to about 99% by weight of the composition.

3. A composition according to claim 1 wherein the poly(imide) comprises from about 15% to about 75% by weight of the composition.

4. A composition according to claim 1 wherein the polymeric component is a poly(etherimide) of the formula:

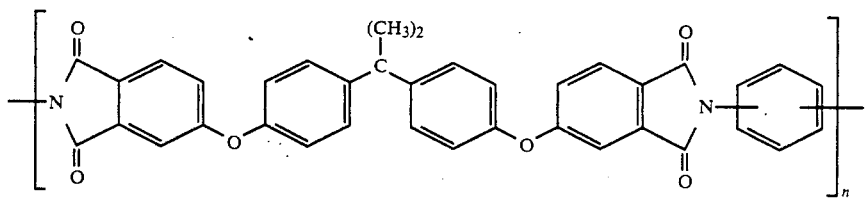

wherein n is greater than 1.

5. A composition according to claim 1 which further has been cured.

6. A composition according to claim 1 wherein the poly(imide) is of the formula:

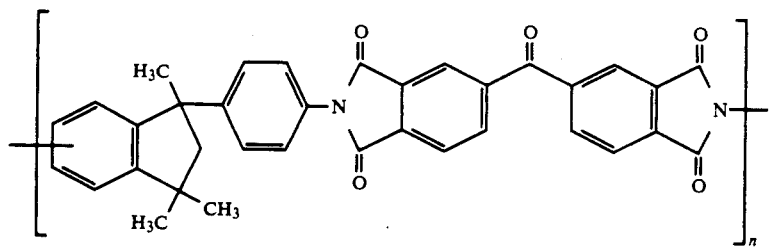

wherein n is greater than 1.

7. A composition according to claim 6 wherein the polymeric component is a poly(etherimide) of the formula:

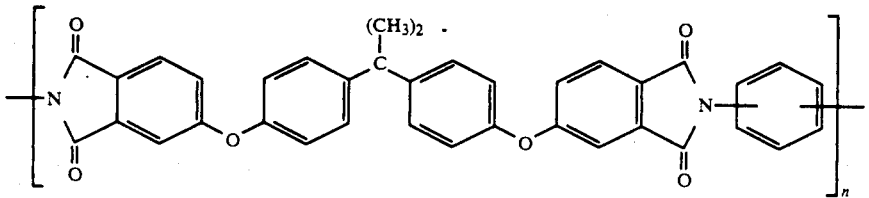

wherein n is greater than 1.

8. A composition according to claim 1 wherein the polymeric component comprises at least 25% by weight of the composition.

9. A shaped article comprising a composition according to claim 1.

10. An adhesive comprising a composition according to claim 1.

11. A coating comprising a composition according to claim 1.

12. A coating according to claim 11, which coating is a semiconductor coating.